(12) United States Patent
Wu et al.

(10) Patent No.: US 11,916,841 B2
(45) Date of Patent: Feb. 27, 2024

(54) DISTANCE-BASED FEEDBACK TRANSMISSION IN SIDELINK COMMUNICATIONS

(71) Applicant: QUALCOMM Incorporated, San Diego, CA (US)

(72) Inventors: Shuanshuan Wu, San Diego, CA (US); Sudhir Kumar Baghel, Hillsborough, NJ (US); Tien Viet Nguyen, Bridgewater, NJ (US); Gabi Sarkis, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 17/191,184

(22) Filed: Mar. 3, 2021

(65) Prior Publication Data

US 2021/0314124 A1 Oct. 7, 2021

Related U.S. Application Data

(60) Provisional application No. 63/005,106, filed on Apr. 3, 2020.

(51) Int. Cl.
*H04L 5/00* (2006.01)
*H04W 72/56* (2023.01)

(52) U.S. Cl.
CPC ........... *H04L 5/0055* (2013.01); *H04W 72/56* (2023.01)

(58) Field of Classification Search
CPC ... H04L 5/0055; H04L 1/1887; H04L 1/1896; H04L 1/1854; H04W 72/56
See application file for complete search history.

(56) References Cited

U.S. PATENT DOCUMENTS

2018/0049220 A1* 2/2018 Patil .................. H04L 5/0064
2018/0359075 A1 12/2018 Lee et al.
(Continued)

FOREIGN PATENT DOCUMENTS

CN 110383743 A 10/2019
EP 4106242 A1 * 12/2022 ........... H04L 1/0023
(Continued)

OTHER PUBLICATIONS

Ericsson: "HARQ Procedure for SL Groupcast", 3GPP Draft, 3GPP TSG-RAN WG2 #106, R2-1907344, HARQ Procedure for SL Groupcast, 3rd Generation Partnership Project (3GPP), Mobile Competence Centre, 650, Route Des Lucioles, F-06921 Sophia-Antipolis Cedex, France, vol. RAN WG2. No. Reno. USA, May 13, 2019-May 17, 2019, May 13, 2019 (May 13, 2019), XP051730783, 4 Pages, Retrieved from the Internet: URL: http://www.3gpp.org/ftp/Meetings%5F3GPP%5FSYNC/RAN2/Docs/R2%2D1907344%2Ezip. [retrieved on May 13, 2019]p. 2. section 2. par. 1.
(Continued)

*Primary Examiner* — Vinncelas Louis
(74) *Attorney, Agent, or Firm* — QUALCOMM Incorporated

(57) ABSTRACT

Certain aspects of the present disclosure provide a method for wireless communications by a first UE. The method includes receiving a data transmission from a second UE. The data transmission is associated with a feedback procedure for data transmissions that is based on a distance between the first UE and a transmitting UE. When the first UE (i) cannot successfully decode the data transmission and (ii) cannot determine the distance between the first UE and the second UE, the method includes determining whether one or more criteria are satisfied for sending, to the second UE, a negative acknowledgement (NACK) for the data transmission as part of the feedback procedure, where the
(Continued)

NACK indicates the first UE could not successfully decode the data transmission. The method including transmitting the NACK to the second UE when the one or more criteria are satisfied.

28 Claims, 9 Drawing Sheets

(56) References Cited

U.S. PATENT DOCUMENTS

| | | | | |
|---|---|---|---|---|
| 2021/0075552 | A1* | 3/2021 | Huang | H04L 1/1864 |
| 2022/0191725 | A1* | 6/2022 | Ashraf | H04L 1/1854 |

FOREIGN PATENT DOCUMENTS

| | | |
|---|---|---|
| WO | 2019156474 A1 | 8/2019 |
| WO | 2020032760 A1 | 2/2020 |
| WO | 2020209676 A1 | 10/2020 |

OTHER PUBLICATIONS

Interdigital Inc: "Physical Layer Procedures for NR V2X Sidelink", 3GPP Draft, 3GPP TSG RAN WG1 #99, R1-1912742, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019 (Nov. 8, 2019), XP051820178, 12 Pages, Retrieved from the Internet: URL: https://ftp.3gpp.org/tsg_ran/WG1_RL1/TSGR1_99/Docs/R1-1912742.zip. R1-1912742 Physicals Layer Procedures for NR V2X Sidelink_final.docx.

International Search Report and Written Opinion—PCT/US2021/020829—ISA/EPO—dated Jun. 14, 2021.

Panasonic: "Discussion on Physical Layer Procedures for Sidelink in NR V2X", 3GPP Draft, 3GPP TSG RAN WG1 #99, R1-1912754, 3rd Generation Partnership Project (3GPP), Mobile Competence Centre, 650, Route Des Lucioles, F-06921 Sophia-Antipolis Cedex, France, vol. RAN WG1, No. Reno, US, Nov. 18, 2019-Nov. 22, 2019, Nov. 8, 2019 (Nov. 8, 2019), XP051820190, 6 Pages, Retrieved from the Internet: URL: https://ftp.3gpp.org/tsg_ran/WG1_RL1/TSGR1_99/Docs/R1-1912754.zip. R1-1912754.docx. [retrieved on Nov. 8, 2019] pp. 3-4.

* cited by examiner

DISTANCE-BASED FEEDBACK TRANSMISSION IN SIDELINK COMMUNICATIONS

CROSS-REFERENCE TO RELATED APPLICATION

The present Application for Patent claims priority to U.S. Provisional Application No. 63/005,106, filed Apr. 3, 2020, which is hereby expressly incorporated by reference herein in its entirety.

BACKGROUND

Field of the Disclosure

Aspects of the present disclosure relate to wireless communications, and more particularly, to techniques for transmitting hybrid automatic repeat request (HARM) feedback in sidelink communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved HARQ feedback transmissions in sidelink communication.

Certain aspects of the subject matter described in this disclosure can be implemented in a method for wireless communication by a first user equipment (UE). The method generally includes receiving, at the first UE, a data transmission from a second UE, the data transmission being associated with a feedback procedure for data transmissions that is based on a distance between the first UE and a transmitting UE, where the first UE cannot successfully decode the data transmission, and cannot determine the distance between the first UE and the second UE. The method further includes determining whether one or more criteria are satisfied for sending, to the second UE, a negative acknowledgement (NACK) for the data transmission as part of the feedback procedure, where the NACK indicates that the first UE could not successfully decode the data transmission. The method further includes transmitting the NACK to the second UE when the one or more criteria are satisfied.

Certain aspects of the subject matter described in this disclosure can be implemented in a first user equipment (UE) including a memory and a processor coupled to the memory. The memory and the processor are configured to receive a data transmission from a second UE, the data transmission being associated with a feedback procedure for data transmissions that is based on a distance between the first UE and a transmitting UE, wherein the first UE cannot successfully decode the data transmission, and wherein the first UE cannot determine the distance between the first UE and the second UE. The memory and the processor are further configured to determine whether one or more criteria are satisfied for sending, to the second UE, a negative acknowledgement (NACK) for the data transmission as part of the feedback procedure, the NACK indicating the first UE could not successfully decode the data transmission. The memory and the processor are further configured to transmit the NACK to the second UE when the one or more criteria are satisfied.

Certain aspects of the subject matter described in this disclosure can be implemented in a first user equipment (UE). The first UE generally includes means for receiving, at the first UE, a data transmission from a second UE, the data transmission being associated with a feedback procedure for data transmissions that is based on a distance between the first UE and a transmitting UE, where the first UE cannot successfully decode the data transmission, and cannot determine the distance between the first UE and the second UE. The first UE further includes means for determining whether one or more criteria are satisfied for sending, to the second UE, a negative acknowledgement (NACK) for the data transmission as part of the feedback procedure, where the NACK indicates that the first UE could not successfully decode the data transmission. The first UE further includes means for transmitting the NACK to the second UE when the one or more criteria are satisfied.

Certain aspects of the subject matter described in this disclosure can be implemented in a non-transitory computer-readable medium including instructions that when executed by a first user equipment (UE), cause the first UE to perform a method for wireless communications. The method generally includes receiving, at the first UE, a data transmission from a second UE, the data transmission being associated with a feedback procedure for data transmissions that is based on a distance between the first UE and a transmitting UE, where the first UE cannot successfully decode the data transmission, and cannot determine the distance between the first UE and the second UE. The method further includes determining whether one or more criteria are satisfied for sending, to the second UE, a negative acknowledgement (NACK) for the data transmission as part of the feedback procedure, where the NACK indicates that the first UE could not successfully decode the data transmission. The method further includes transmitting the NACK to the second UE when the one or more criteria are satisfied.

Aspects of the present disclosure provide means for, apparatus, processors, and computer-readable mediums for performing the methods described herein.

Aspects of the present disclosure provide means for, apparatus, processors, and computer-readable mediums for performing techniques and methods that may be complementary to the operations by the UE described herein, for example, by a base station.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
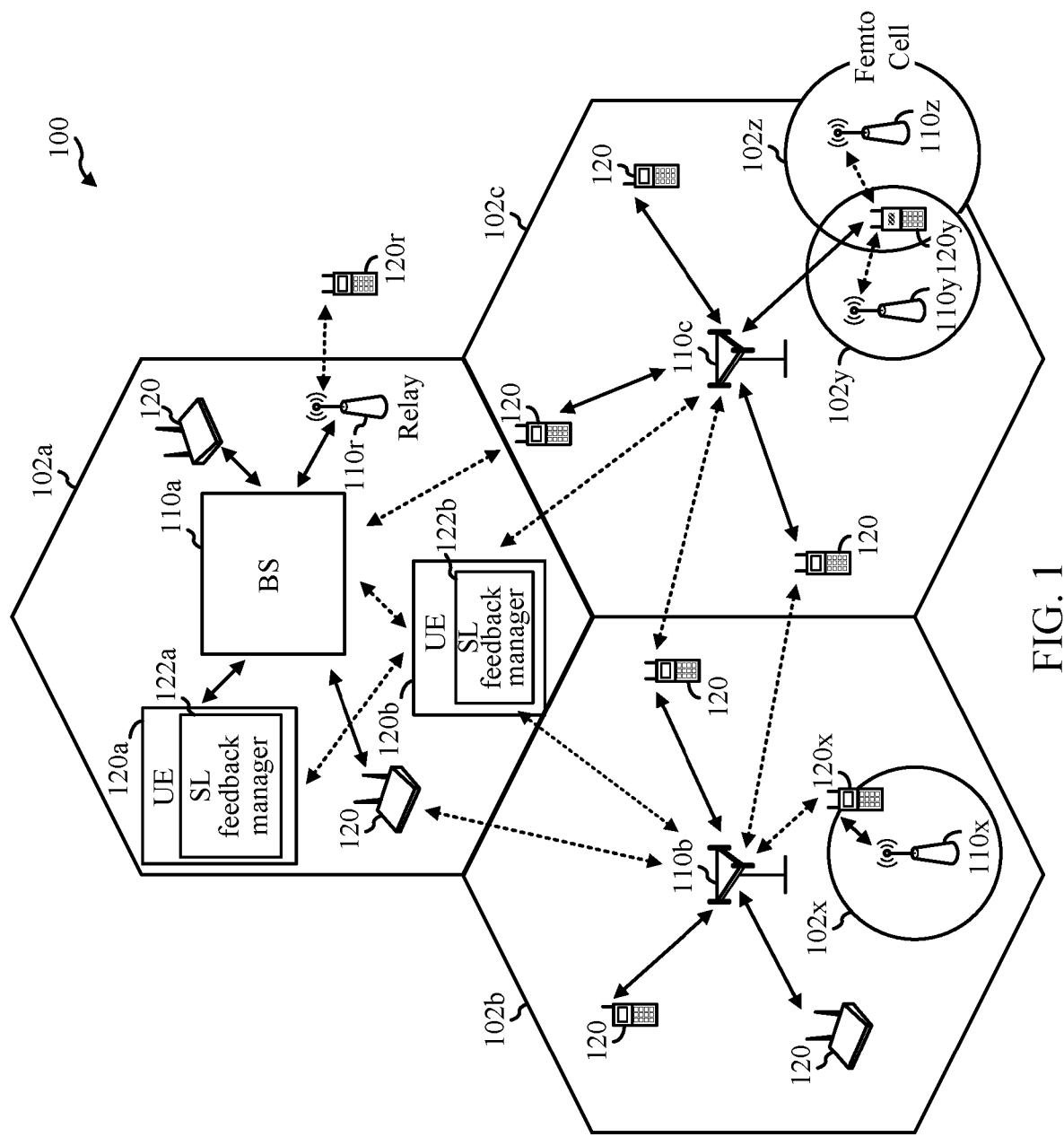
FIG. 1 is a block diagram conceptually illustrating an example telecommunications system, in accordance with certain aspects of the present disclosure.

In New Radio (NR), a user equipment (UE) may exchange sidelink data (e.g., user data and control signaling) with other UEs directly and without the help (e.g., relaying) of a base station. This type of sidelink communication is often called peer-to-peer (also referred to as device-to-device or D2D) communication. An example of peer-to-peer communication includes vehicle to everything (V2X) communication where a vehicle may communicate with another vehicle (V2V) or a different device, such as a base station, a traffic control system, or the like.

One challenge in V2X systems is to acknowledge the safe receipt of sidelink data by a receiving UE (may also be referred to as an Rx UE). That is, in order to improve sidelink communications, an Rx UE may need to send positive (e.g., an acknowledgement (ACK)) (or negative (e.g., a NACK)) feedback (e.g., hybrid automatic repeat request (HARQ) feedback) to the transmitting UE (may also be referred to as a Tx UE) acknowledging the successful (or unsuccessful) receipt of the data. For example, when the Rx UE is not successful in decoding the data received from the Tx UE, the Rx UE may need to send a negative acknowledgment (NACK) to the Tx UE to indicate to the Tx UE that the data transmission was not successful.

In some aspects, sending feedback by the Rx UE is not related to the distance between the Rx UE and the Tx UE (may also be referred to as the Tx-Rx distance). Such feedback may be called non-distance-based feedback in some aspects of the present disclosure. In some other aspects, a Tx UE may require feedback only when the Tx-Rx distance is shorter than a threshold distance. Such feedback may be called distance-based feedback in certain aspects of the present disclosure. For distance-based feedback transmission, in certain aspects, the Rx UE may send feedback (e.g., HARQ feedback) only if the feedback is a NACK (e.g., the data transmission is not successful) and the Rx UE is within the threshold distance of the Tx UE. In some aspects, the threshold distance is indicated to the Rx UE (e.g., from the Tx UE) in a second stage sidelink control information (SCI or SCI-2). For example, the SCI may include a minimum communication range value (e.g., 4-bits) indicative of the threshold. In certain aspects, the value of the minimum communication range maps to a value in meters (e.g., 200 meters) that corresponds to the threshold distance.

In some aspects, the location of the Tx UE may be determined by the Rx UE, for example, from the data received from the Tx UE (e.g., indicated in the second stage sidelink control information (SCI or SCI-2) received from the Tx UE). However, in some aspects, the Tx UE location may not be received by or available to the Rx UE. Further, in some aspects, the location of the Rx UE may be unavailable to the Rx UE. For example, the Rx UE may be unable to determine its location (e.g., through global navigation satellite system (GNSS) signals) due to a blockage (e.g., when the Rx UE is in a tunnel).

Aspects of the present disclosure provide apparatus, methods, processing systems, and computer readable mediums for an Rx UE to transmit distance-based feedback to a Tx UE when the data transmitted from the Tx UE cannot be decoded by the Rx UE and at the same time the Rx UE cannot determine the distance between the Tx UE and the Rx UE (e.g., when the location of the Rx UE and/or the Tx UE cannot be determined by the Rx UE). Some aspects of the present disclosure may require one or more criteria to be satisfied before transmitting a distance-based NACK to the Tx UE.

For example, some aspects may determine, based on the Rx UE's configuration and/or capability, whether the UE includes enough capacity for transmitting one or more distance-based NACKs using sidelink resources (e.g., one or more slots in a physical sidelink feedback channel (PSFCH) allocated for transmissions of feedback). Some aspects may transmit the distance-based NACK(s) using the allocated resources when all the non-distance-based feedback can be carried on the sidelink feedback channel and the UE still has additional capacity for transmitting one or more distance-based feedbacks. In some other aspects, if a priority of a distance-based feedback is higher than a priority of a non-distance-based feedback, the distance-based feedback may replace the non-distance-based feedback on the sidelink feedback channel (e.g., on the one or more slots on the PSFCH that are allocated to feedback transmissions). Other aspects may require other criteria to be satisfied for the transmission of distance-based NACK feedbacks.

The following description provides examples of HARQ feedback transmissions in sidelink communications, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 is a block diagram conceptually illustrating an example wireless communication network 100, in accordance with certain aspects of the present disclosure. For example, wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipments (UEs) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

As shown in FIG. 1, UEs 120a and 120b may include, among other modules/managers, sidelink (SL) feedback managers 122a and 122b, respectively. UE 120a may directly communicate with UE 120b through a sidelink channel (e.g., a physical sidelink control channel (PSCCH) or a physical sidelink shared channel (PSSCH), etc.). For example, UE 120a may transmit data to UE 120b using a PSSCH. UE 120a may require a feedback from UE 120b if UE120b is within a certain distance from UE 120a and the data transmission was not successful. As such, in certain aspects, SL feedback manager 122b may transmit a NACK feedback to UE 120a (e.g., on one or more slots of a PSFCH established between UE 120b and UE 120a) when UE 120b is (i) unable to decode the data transmission successfully and (ii) within a threshold distance of UE 120a.

Figure 2:
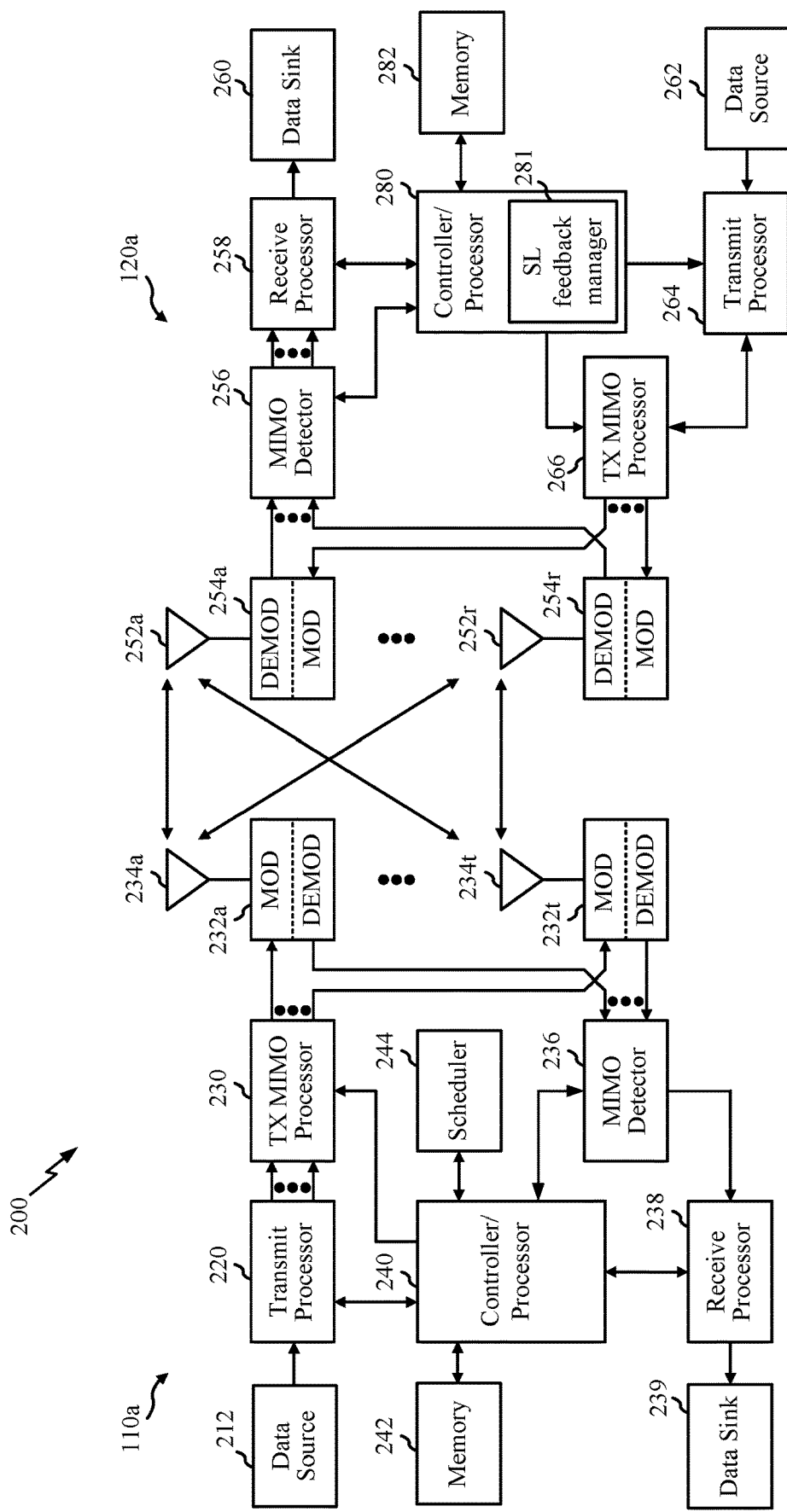
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 280 of the UE 120a may have an SL feedback manager 281 configured for (HARQ) feedback transmissions, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
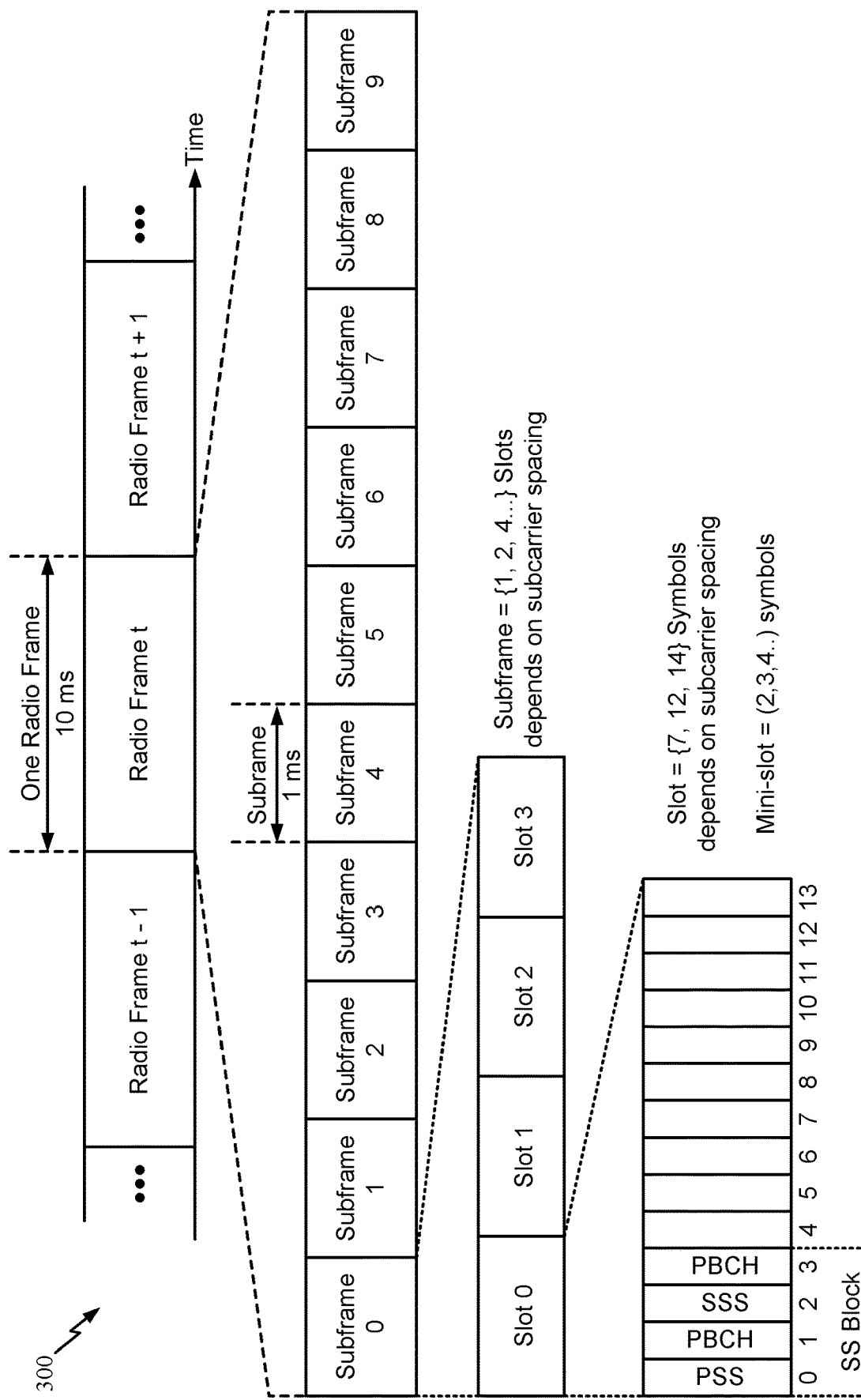
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, while the SS may provide the CP length and frame timing. The PSS and SSS may provide the cell identity. The PBCH carries some basic system information, such as downlink system bandwidth, timing information within radio frame, SS burst set periodicity, system frame number, etc.

The SSBs may be organized into SS bursts to support beam sweeping. Further system information, such as remaining minimum system information (RMSI), system information blocks (SIB s), other system information (OSI) may be transmitted on a physical downlink shared channel (PDSCH) in certain subframes. The SSB may be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets may be transmitted at different frequency regions.

In some examples, the communication between the UEs 120 and BS s 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a, as shown in FIG. 1) to another subordinate entity (e.g., UE 120b) without relaying that communication through the scheduling entity (e.g., BS 110a), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling, such as sidelink resource configurations and other parameters used for data transmissions, and the PSSCH may carry the data transmissions. The PSFCH may carry sidelink feedbacks, such as distance-based and/or non-distance-based HARQ feedbacks related to data transmissions between two or more UEs that are in direct communication with each other.

Figure 4B:
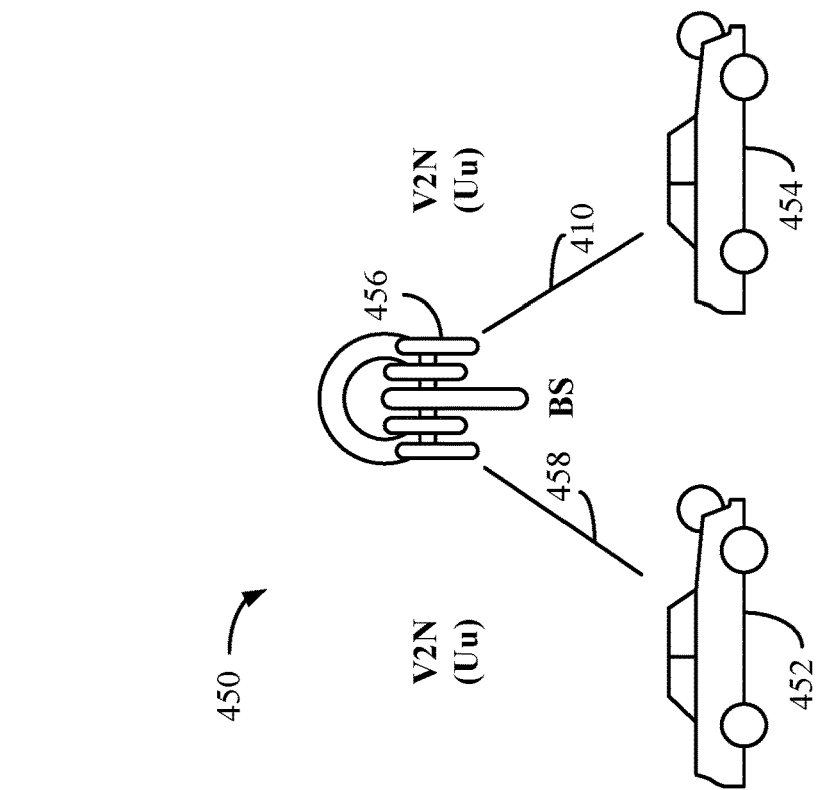
FIG. 4A and FIG. 4B illustrate diagrammatic representations of example vehicle to everything (V2X) systems, in accordance with certain aspects of the present disclosure.
Figure 4A:
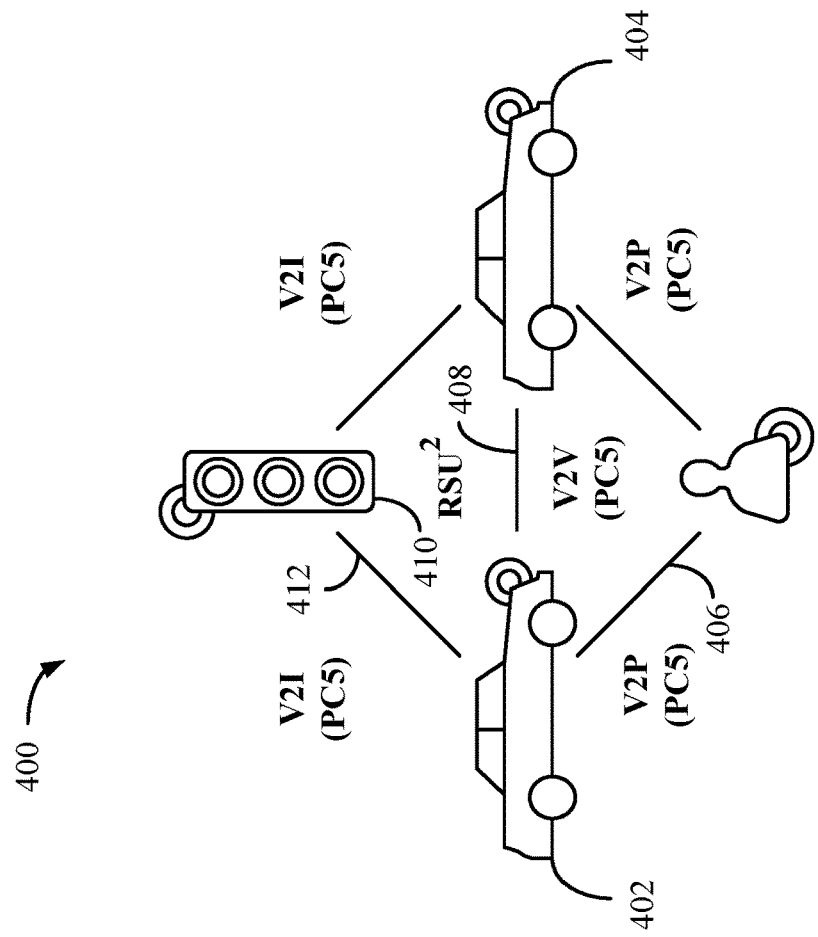

FIG. 4A and FIG. 4B show diagrammatic representations of example V2X systems, in accordance with some aspects of the present disclosure. For example, the vehicles shown in FIG. 4A and FIG. 4B may perform data transmissions via sidelink channels and may receive sidelink feedbacks regarding those data transmissions, as described herein.

The V2X systems that are shown in FIG. 4A and FIG. 4B provide two complementary transmission modes. A first transmission mode, shown by way of example in FIG. 4A, may involve direct communications (may also be referred to as sidelink communications) between participants in proximity to one another in a local area. Sidelink transmissions by the UEs (e.g., Vehicles 402 and 404, or traffic light 410) may implemented over a PC5 interface (e.g., a wireless communication interface between a first UE and a second UE). A second transmission mode, shown by way of example in FIG. 4B, may involve network communications through a network, which may be implemented over a Uu interface (e.g., a wireless communication interface between a radio access network (RAN) and a UE).

Referring to FIG. 4A, a V2X system 400 (e.g., vehicle to vehicle (V2V) communications) is illustrated with two vehicles 402, 404. The first transmission mode allows for direct communication between different participants in a given geographic location. As illustrated, a vehicle 402 can have a wireless communication link 406 with an individual (V2P) (e.g., with a mobile phone of the individual) through a PC5 interface. Communications between the vehicles 402 and 404 may also occur through a PC5 interface 408. In a like manner, communication may occur from a vehicle 402 to other highway components (e.g., highway component 410), such as a traffic signal or sign (V2I) through a PC5 interface 412. With respect to each communication link illustrated in FIG. 4A, two-way communication may take place between elements, therefore each element may be a transmitter and a receiver of information.

The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed and/or unlicensed spectrum, thus any vehicle with an equipped system may access a common frequency and share information. Such harmonized/common spectrum operations may allow for safe and reliable operations.

FIG. 4B shows a V2X system 450 for communication between a vehicle 452 and a vehicle 454 through a network entity 456. These network communications may occur through discrete nodes, such as a BS (e.g., the BS 110a shown in FIG. 1), that sends and receives information to and from (or relays information between) vehicles 452, 454. The network communications through vehicle to network (V2N) links 458 and 410 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

As described above, in some aspects of the present disclosure, an Rx UE may transmit one or more distance-based feedbacks to one or more Tx UEs when (i) the data transmitted from the Tx UEs cannot be decoded by the Rx UE and (ii) the Rx UE cannot determine the distance between the Tx UE and the Rx UE (e.g., when the location of the Rx UE and/or the Tx UE cannot be determined by the Rx UE). Some aspects of the present disclosure may require one or more criteria to be satisfied before the Rx UE transmits a distance-based NACK feedback to a Tx UE.

For example, some aspects may determine, based on the Rx UE's configuration and/or capability, whether the Rx UE includes enough capacity for transmitting distance-based (DB) NACK feedbacks. That is, in some aspects, an Rx UE may send a non-distance-based (NDB) feedback (ACK or NACK) that is independent of Tx-Rx distance (e.g., in a unicast transmission). Additionally, an Rx UE may send multiple feedbacks in one HARQ transmission slot (e.g., a PSFCH slot). When the Rx UE receives multiple relevant sidelink data transmissions (e.g., on one or more PSSCHs from one or more transmitting UEs), the Rx UE may need to transmit multiple feedbacks in one PSFCH slot. However, the number of feedbacks the Rx UE is able to transmit in a single PSFCH slot may be limited. Such limitation may be imposed by the UE's capability and/or configuration. For example a UE may only be able to transmit no more than N feedbacks in a single PSFCH slot, N being an integer greater than zero. In certain aspects, N may be predefined or configured for the UE. In some aspects, selection of the N feedbacks may depend on the data transmission priority (e.g., transmitting feedbacks to lower priority traffic may be dropped if the number of feedbacks is greater than N). In some aspects, the Rx UE may transmit a DB HARQ feedback if the Rx UE has available feedback transmission capacity.

As discussed above, when the Rx UE's location is not available, the UE can still transmit NDB feedbacks (e.g., ACK or NACK feedbacks to unicast transmissions, ACK or NACK feedback to groupcast transmissions that do not need distance, etc.) using the sidelink feedback resources. In some aspects, if there is remaining capacity for feedback transmission (e.g., the number of NDB HARQ feedbacks to be transmitted is smaller than the feedback transmission limit N), the Rx UE may transmit additional DB feedback(s) (e.g., when the feedbacks are NACK and the Tx-Rx distance is not available).

Some aspects may transmit the additional DB NACK feedback(s) when all the NDB feedbacks can be carried on the sidelink feedback channel and there is still additional space for one or more DB feedbacks (i.e., number of NDB feedbacks is smaller than N). In some other aspects, if a priority of a DB feedback is higher than a priority of an NDB feedback, the distance-based feedback may be prioritized on the sidelink feedback channel (e.g., on the one or more slots on the PSFCH). Other aspects may require other criteria to be satisfied for the transmission of distance-based NACK feedbacks. Transmission of DB NACK feedbacks when the Tx-Rx distance is not available and the different criteria required to be satisfied for such transmissions are described in more detail below, with reference to FIGS. 5-8.

Figure 5:
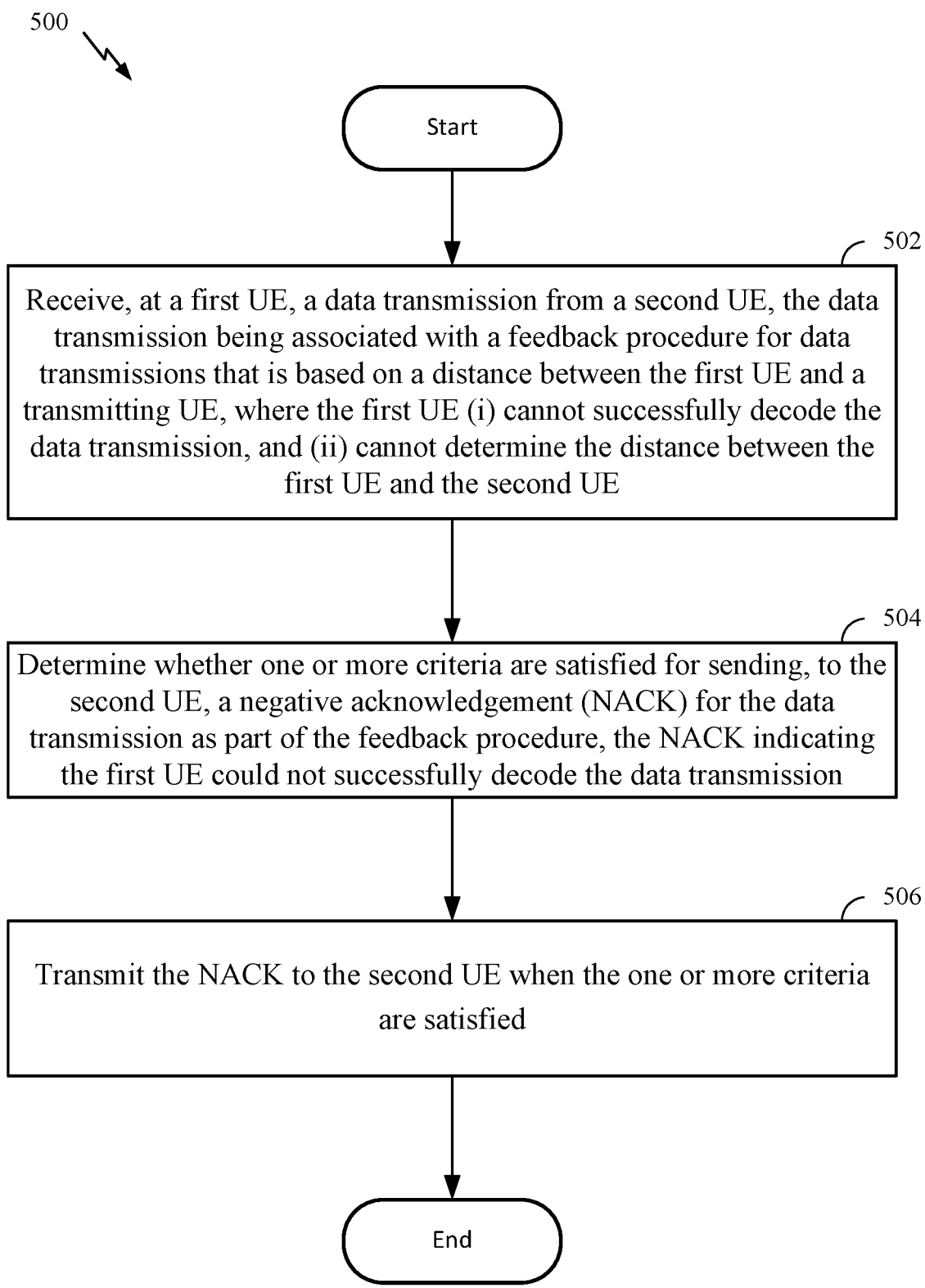
FIG. 5 is a flow chart illustrating an example of a process/operations for transmitting distance-based negative acknowledgement (NACK) feedback to a transmitting (Tx) UE when data received from the Tx UE was not decoded successfully and the distance to the Tx UE is not available, in accordance with certain aspects of the present disclosure.

FIG. 5 is a flowchart illustrating an example of a process/operations 500 for transmitting a distance-based NACK feedback to a Tx UE when data received from the Tx UE was not decoded successfully and the distance to the Tx UE is not available, in accordance with certain aspects of the present disclosure. Operations 500 may be performed, for example, by an Rx UE (e.g., such as UE 120a in the wireless communication network 100, as shown in FIG. 1). Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 500 may begin, at 502, by receiving, at a first UE (e.g., an Rx UE), a data transmission from a second UE (e.g., a Tx UE). The data transmission may be associated with a feedback procedure for data transmissions that is based on a distance between the first UE and a transmitting UE. For example, the Tx UE may indicate to the Rx UE that the data transmission requires a DB feedback. As such, the Rx UE may conventionally send a NACK feedback to the Tx UE only when the locations of the Rx UE and the Tx UE can be determined. However, as indicated by operation 502, the first UE cannot successfully decode the data transmission, nor is the first UE able to determine the distance between the first UE and the second UE.

At 504, the first UE may therefore determine whether one or more criteria are satisfied for sending, to the second UE, a NACK feedback for the data transmission as part of the feedback procedure. The NACK feedback, as discussed above, may indicate that the first UE could not successfully decode the data transmission. The first UE may transmit, at 506, the NACK feedback to the second UE when the one or more criteria are satisfied.

For example, when the first UE is configured to transmit (or capable of transmitting) up to a first number of feedbacks during a time interval, the one or more criteria may include whether the first UE has available capacity to transmit the NACK feedback during the time interval based on (i) the first number of feedbacks and (ii) a second number of feedbacks the first UE has for feedback transmission during the time interval based on a second feedback procedure that is not based on a distance between the first UE and a transmitting UE (e.g., an NDB feedback procedure). In some aspects, when the second number of feedbacks (e.g., the number of NDB feedbacks) is greater than, or equal to, the first number of feedbacks, the one or more criteria may not be satisfied. That is, when the number of NDB feedbacks is greater than, or equal to, the total number of feedbacks the UE is capable of transmitting, the first UE (e.g., the Rx UE) may not transmit the DB NACK feedback to the second UE (e.g., the Tx UE) and may only transmit the NDB feedbacks (ACK or NACK feedbacks).

For example, based on the configuration and/or capability of an Rx UE, the Rx UE may be able to transmit 4 HARQ feedbacks in one PSFCH slot. If the Rx UE has 3 NDB HARQ feedbacks (e.g., feedbacks that do not rely on the Tx-Rx distance) to transmit in a PSFCH slot, and there is a data transmission received from a Tx UE that is not decoded successfully and that requires a DB feedback, the Rx UE may transmit the distance-based HARQ NACK feedback to the Tx UE using the remaining one spot left in the PSFCH slot, if Tx-Rx distance could not be determined (e.g., Rx location is not available).

In certain aspects, in addition to the first number (total number of feedbacks) and the second number (of NDB feedbacks), a third number of feedbacks the first UE has for transmission during the time interval based on the DB feedback procedure may also be included in the one or more criteria for DB NACK feedback transmissions. That is, the one or more criteria may also depend on the number of DB NACK feedback transmissions the Rx UE has at the time of the transmission of one or more NACK feedbacks to the Tx UE.

In some aspects, when the Rx UE has multiple DB NACK feedbacks to transmit, the Rx UE may fill the empty spots in the feedback slot based on the priorities assigned to the feedback transmissions. For example, when there is only one spot left on the PSFCH feedback transmission slot, the Rx UE may transmit the NACK feedback to the Tx UE that has the highest priority among all the NACK feedbacks the Rx UE has for transmission. In some aspects, the priority assigned to a NACK feedback may be the same as the priority of a corresponding data transmission received by the Rx UE.

Figure 6:
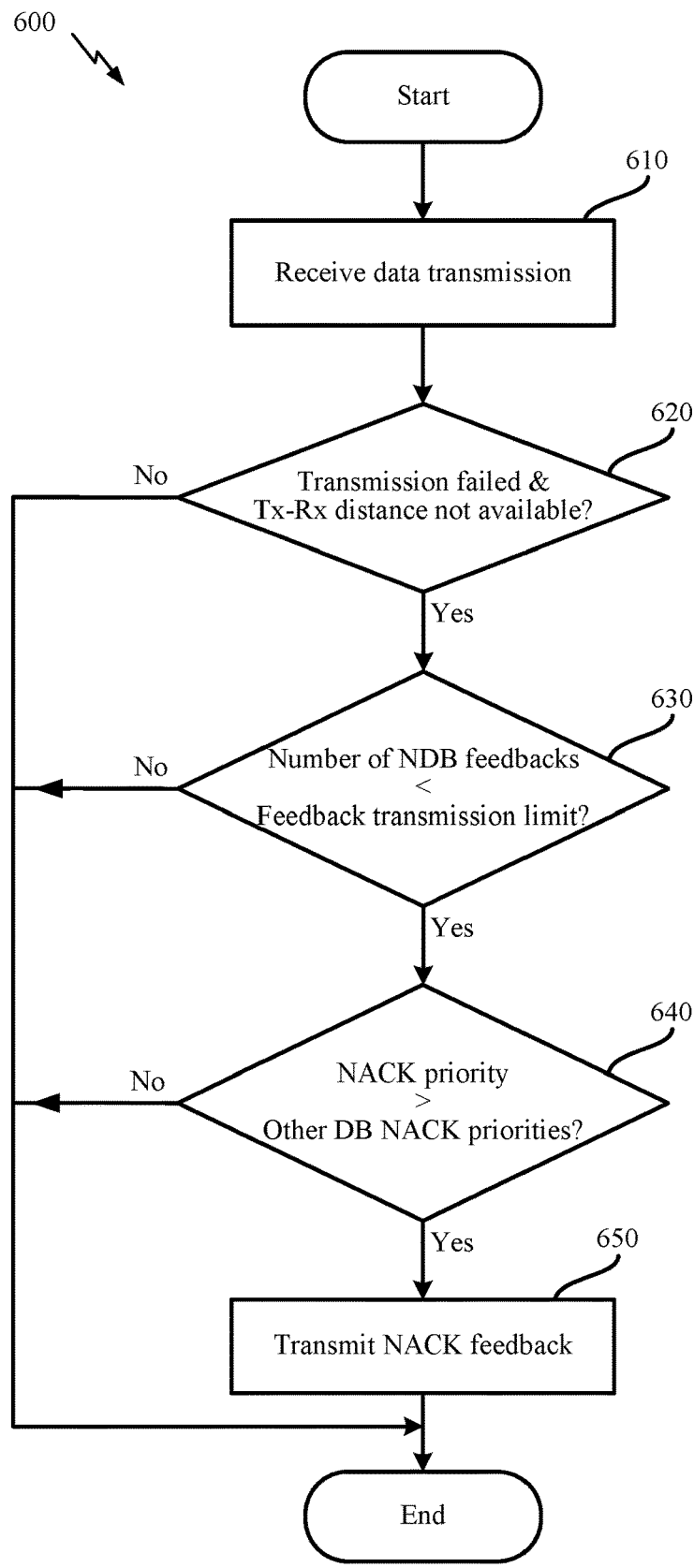
FIG. 6 is a flowchart illustrating an example of a process/operations for transmitting distance-based NACK feedback to a Tx UE based on the priority of the NACK feedback, in accordance with certain aspects of the present disclosure.

FIG. 6 is a flowchart illustrating an example of a process/operations 600 for transmitting a distance-based NACK feedback to a Tx UE based on the priority of the NACK feedback, in accordance with certain aspects of the present disclosure. Operations 600 may be performed, for example, by an Rx UE (e.g., such as UE 120a in the wireless communication network 100, as shown in FIG. 1).

Operations 600 may begin, at 610, by receiving a data transmission (e.g., a data packet or a transport block (TB)) from a Tx UE. The data transmission may indicate that a distance-based HARQ feedback is required for the data transmission. The process may then determine, at 620, whether the data transmission has failed (e.g., the data in the data transmission could not be decoded successfully) and the Tx-Rx distance is unknown (e.g., when the location of the Rx UE and/or the Tx UE cannot be determined). When the process determines that either the data transmission was successful or the Tx-Rx distance is determinable, the process may end. In other words, when the process determines that there is no need for a DB NACK transmission, or the process determines that DB NACK transmission is needed but distance is available, the operation may just follow the regular DB NACK transmission mechanism (e.g., transmit NACK if Tx-Rx distance is smaller than a distance threshold), and the process may end.

On the other hand, when the process determines that both conditions are satisfied (e.g., the data has not been decoded successfully and the Tx-Rx distance is not determinable), the process may determine, at 630, whether the number of NDB feedbacks the Rx UE has for transmission to the Tx UE is less than the total number of feedbacks the Rx UE is configured to transmit to the Tx UE using the PSFCH resources. If the process determines that the number of NDB feedbacks is greater than, or equal to, the feedback transmission limit of the Rx UE, the process may end.

On the other hand, if the process determines that the number of NDB feedbacks is less than the feedback transmission limit of the Rx UE, the process may determine, at 640, whether the priority assigned to the NACK feedback (which may be the same as the priority of the corresponding data transmission received at 610) is greater than the priorities assigned to other DB NACK feedbacks that are to be transmitted to the Tx UE. If the priority of the NACK feedback is not greater than the priorities of the other DB NACK feedbacks, the process may end.

On the other hand, if the process determines that the priority assigned to the NACK feedback is greater than the priorities of the other DB NACK feedbacks, the process may transmit, at 650, the NACK feedback for the received data transmission to the Tx UE, for example, when, based on the capacity of the Rx UE, only one more NACK DB feedback can be transmitted using the feedback transmission resources (e.g., one or more PSFCH slots allocated for the transmission of the feedbacks). The process may then end.

The specific operations of process 600 may not be performed in the exact order shown and described. Additionally, the specific operations may not be performed in one continuous series of operations, and different specific operations may be performed in different embodiments. For example, when process 600 determines (e.g., at 640) that the priority of the NACK feedback is equal to the priority of one or more other NACK feedbacks, in some aspects of the present disclosure, the process may determine which NACK feedback to select for transmission based on the UE implementation. For example, when the Rx UE's remaining capacity is to accommodate only one distance-based feedback, but the UE has two distance-based feedbacks to transmit, and the two feedbacks have equal priorities, then, in certain aspects, it is up to the UE implementation on which feedback to select for transmission.

In operations 600, as described above, when Rx UE's location is not available (or the Tx-Rx distance is not available for any other reason), non-distance based feedback is always prioritized irrespective of the priority level assigned to a distance-based feedback being higher or not. If there is available capacity for feedback transmission (after all non-distance based feedbacks have been counted), the Rx UE may select distance-based feedbacks based on their priorities (a higher priority distance-based feedback may be selected first for the remaining capacity). For example, if there is capacity for X (X being an integer) additional feedback transmissions, the Rx UE may select the X DB feedbacks having the X highest priorities (i.e., associated with transmissions having the X highest priorities).

An example for operations 600 will now be described. As described above, if a data transmission priority has a value between 1 to 9 (e.g., the smaller the value the higher the priority), a corresponding HARQ feedback's priority may have the same value as the priority value of the data transmission. An example Rx UE may be able to transmit 4 HARQ feedbacks (N=4) in a PSFCH slot according to the configuration or capability of the UE. The Rx UE may receive five data transmissions and have 3 non-distance based feedbacks with priorities 1, 2, and 7 to transmit, and 2 distance based feedbacks with priorities 2 and 4 to transmit in the same PSFCH slot. Based on the operations 600 described above, the Rx UE may transmit all 3 non-distance based feedbacks and the distance based feedback that has priority 2.

In some other aspects of the present disclosure, however, a non-distance based feedback is not always transmitted even if there is available capacity. In certain aspects, a priority threshold may be configured and/or predefined for the UE. For example, a base station may configure the Rx UE (e.g., through PDCCH signaling) with a priority threshold, or the Tx UE may configure the Rx UE (e.g., through PSCCH signaling) with a priority threshold, or the UEs may be pre-configured with a priority threshold. In some aspects, the Rx UE may transmit only the DB NACK feedbacks that have a priority higher than the threshold priority when there is available capacity. For example, in the above-described example, if the priority threshold is 1, all three NDB feedbacks may be transmitted, while none of the DB NACK feedbacks may be transmitted (because their priorities are 2 and 4, both of which are lower than 1) even though there is remaining capacity (N=4) for transmitting one of the DB NACK feedbacks.

In some other aspects of the present disclosure, however, a non-distance based feedback is not always prioritized over a distance-based feedback. In some aspects, a DB NACK feedback that has a higher priority than an NDB feedback (e.g., and a higher priority than the priority threshold configured to the UE) may be sent instead of the lower priority NDB feedback (e.g., when the lower priority NDB feedback has a priority less than the priority threshold). In the above-described example, assuming that the priority threshold is 4, the two NDB feedbacks with priorities 1 and 2, and the two DB NACK feedbacks with priorities 2 and 4 may be transmitted to the Tx UE. In the same example, assuming that the priority threshold is set to 3, all three NDB feedbacks with priorities 1, 2, and 7, and one DB NACK feedback with priority 2 may be transmitted to the Tx UE.

In some aspects of the present disclosure, an Rx UE may transmit distance based HARQ feedbacks based on the number of retransmissions of a data transmission (e.g., the packets/transport blocks (TB) that have been transmitted) to the Rx UE. A Tx UE may perform retransmissions of a TB either blindly (may also be referred to as blind retransmission), in which the Tx UE may retransmit the TB without waiting for any feedback from the Rx UE, or based on feedback(s) received from the Rx UE. The Rx UE may determine (or calculate) the number of data retransmissions using one or more parameters received, for example, in control signaling. For example, the Rx UE may calculate the number of retransmissions based on the HARQ process identity (ID) and/or new data indication (NDI) included in sidelink control signaling (SCI) received from the Tx UE.

When an Rx UE receives a TB on a PSSCH, to perform feedback transmissions, the Rx UE may need to know which Tx UE has transmitted the TB. For this purpose, when the Tx UE transmits a TB on the PSSCH, a source ID and a destination ID may be indicated in a corresponding second stage SCI. In addition to the source ID and the destination ID, to facilitate feedback transmissions, the contents of the SCI may also include an NDI and a HARQ process ID. The NDI may indicate whether the current TB is a new transmission or a retransmission, while the HARQ process ID may enable the Tx UE and the Rx UE to associate a transmitted TB with the corresponding HARQ ACK/NACK.

Once the number of retransmissions reaches a threshold and the Rx UE is still not able to decode the data in the transmissions, in some aspects, the Rx UE may transmit a DB NACK feedback to the Tx UE even though the Tx-Rx distance may not be available. That is, in certain aspects, the one or more criteria for transmitting a DB NACK feedback when the Tx-Rx distance is not available may include the number of retransmissions of the data to the Rx UE. The retransmission threshold may be the number of maximum allowed transmissions of a TB (e.g., in the physical (PHY) layer or a medium access control (MAC) layer, a TB may be transmitted up to 32 times) in some aspects, while in other aspects, it might be predefined and/or configured (e.g., by a BS or the Tx UE, as described above). In some aspects, after the threshold number of (re)transmissions, the Rx UE may transmit a DB NACK feedback.

In some aspects of the present disclosure, the Rx UE may transmit the distance-based NACK feedback after the threshold number of (re)transmissions only when the priority of the NACK feedback is not lower than a priority threshold. In some aspects, when the Rx UE sends a DB NACK feedback to the Tx UE after a threshold number of retransmissions, for example, in the MAC/PHY layer, the Tx UE may initiate an upper layer (e.g., a radio link control (RLC) layer) retransmission of the data.

Figure 7:
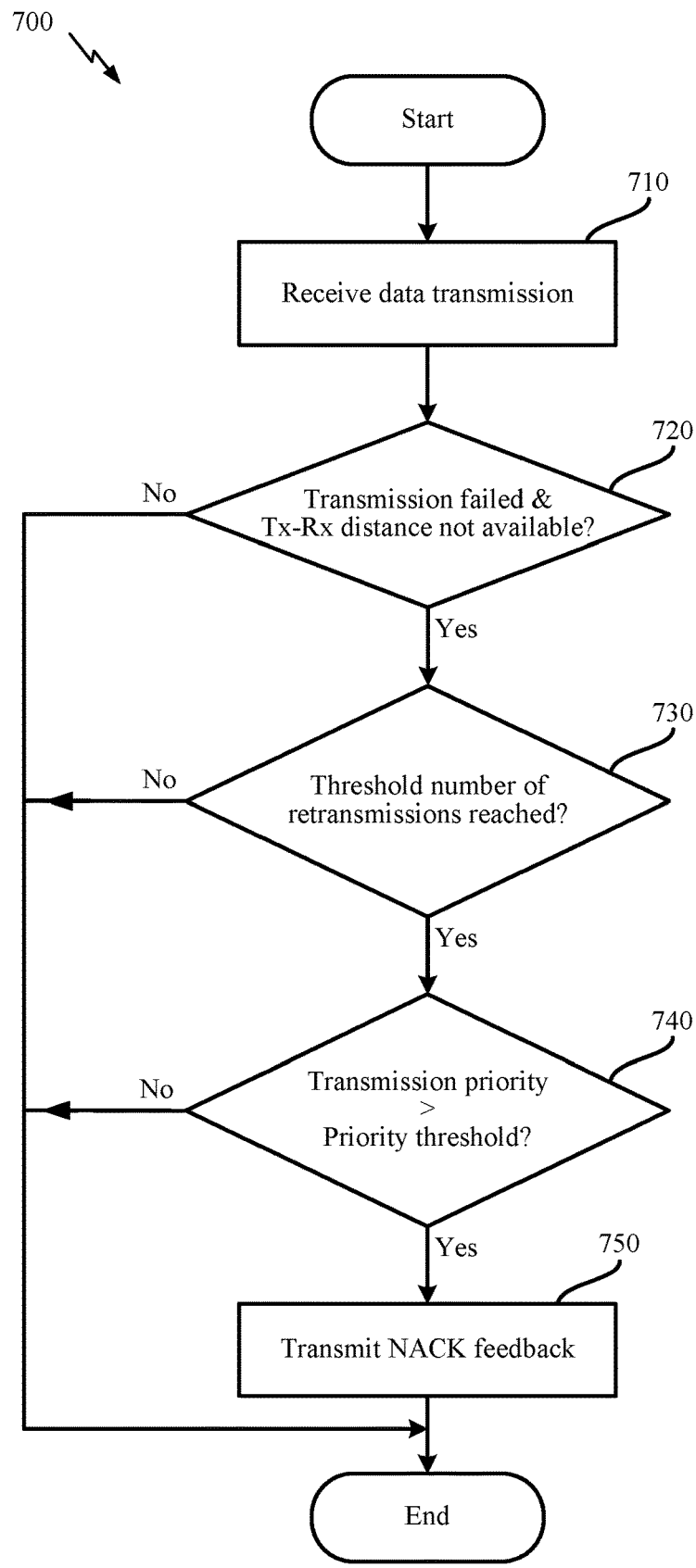
FIG. 7 is a flowchart illustrating an example of a process/operations for transmitting distance-based NACK feedback to a Tx UE based on the number of data (re)transmissions, in accordance with certain aspects of the present disclosure.

FIG. 7 is a flowchart illustrating an example of a process/operations 700 for transmitting a distance-based NACK feedback to a Tx UE based on the number of data (re)transmissions, in accordance with certain aspects of the present disclosure. Operations 700 may be performed, for example, by an Rx UE (e.g., such as UE 120a in the wireless communication network 100, as shown in FIG. 1).

Operations 700 may begin, at 710, by receiving a data transmission from a Tx UE. The data transmission may indicate that a distance-based HARQ feedback is required for the data transmission. The process may then determine, at 720, whether the data transmission has failed (e.g., the data in the data transmission could not be decoded successfully) and the Tx-Rx distance is unknown (e.g., when the location of the Rx UE and/or the Tx UE cannot be determined). When the process determines that either the data transmission was successful or the Tx-Rx distance is determinable, the process may end. In other words, when the process determines that there is no need for a DB NACK transmission, the process may end.

On the other hand, when the process determines that both conditions are satisfied (e.g., the data has not been decoded successfully and the Tx-Rx distance is not determinable), the process may determine, at 730, whether a threshold number of data (re)transmissions has been reached. As described above, the process may determine the number of (re)transmissions based on one or more parameters in the sidelink control signaling (e.g., in the SCI). The threshold number of (re)transmissions may also be configured to the Rx UE, or may be predefined. If the process determines that the threshold number of data (re)transmissions has not been reached, the process may end.

On the other hand, if the process determines that the threshold number of data (re)transmissions has been reached, the process may determine, at 740, whether the priority assigned to the NACK feedback (which may be the same as the priority of the corresponding data transmission received at 710) is greater than a priority threshold (e.g., configured to the Rx UE by a BS or the Tx UE, as described above). If the priority of the NACK feedback is lower than the priority threshold, the process may end.

On the other hand, if the process determines that the priority assigned to the NACK feedback is greater than the priority threshold, the process may transmit, at 750, the NACK feedback for the received data transmission to the Tx UE. The process may then end. It should be noted that the DB NACK transmission may still be subject to priority-based feedback selection, as described above. For example, when there are multiple DB NACK feedbacks to be transmitted to the Tx UE(s), the highest ranked NACK feedback may be selected first. In particular, various aspects described herein may be combined in any suitable fashion.

In some aspects of the present disclosure, an Rx UE may transmit distance based HARQ feedbacks based on one or more measurements performed on the sidelink channel (e.g., the PSSCH). In other words, in certain aspects, the one or more criteria may include whether a measurement of the sidelink channel satisfies a threshold. For example, the Rx UE may measure a channel busy ratio (CBR) of the sidelink channel. The Rx UE may then transmit the DB NACK feedback when the measured CBR is below a predefined or configured threshold. As another example, the Rx UE may measure the received signal strength, e.g., based on the received signal strength indicator (RSSI), and may transmit the DB NACK feedback only when the measured signal strength is below a threshold. In some aspects, a higher level of RSSI may indicate a higher level of channel occupancy. In yet some other aspects, a combination of two or more sidelink channel measurements may determine the transmission of the DB NACK feedbacks.

In some aspects, the Rx UE may transmit the DB NACK feedback not only when the measurement satisfies a threshold, but also when the priority assigned to the DB NACK feedback satisfies a threshold priority as well. For example, the Rx UE may forgo transmission of a DB NACK feedback, even though the channel measurement satisfies the threshold, when the priority level assigned to a corresponding data transmission of the DB NACK feedback is below a threshold level. In particular, various aspects described herein may be combined in any suitable fashion.

Figure 8:
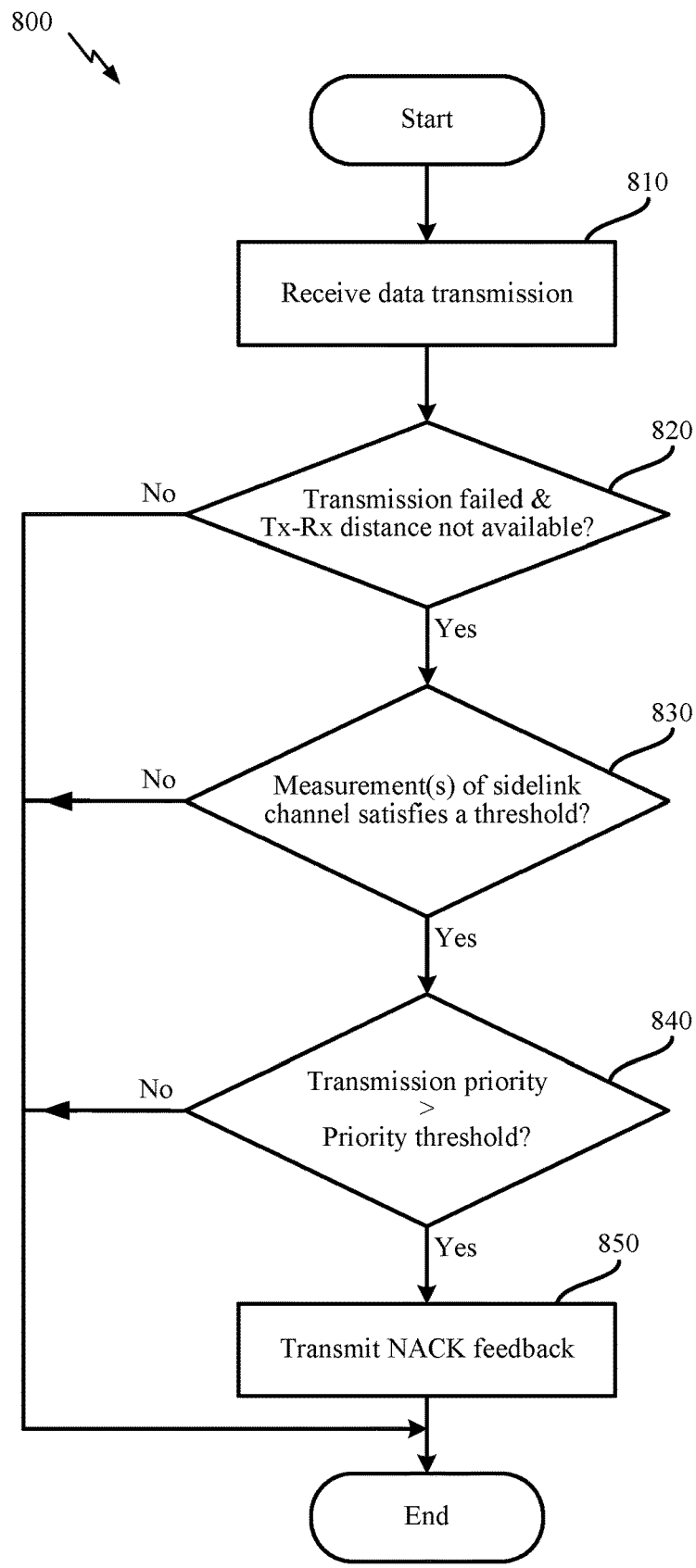
FIG. 8 is a flowchart illustrating an example of a process/operations for transmitting distance-based NACK feedback to a Tx UE based on one or more sidelink channel measurements, in accordance with certain aspects of the present disclosure.

FIG. 8 is a flowchart illustrating an example of a process/operations 800 for transmitting a distance-based NACK feedback to a Tx UE based on one or more sidelink channel measurements, in accordance with certain aspects of the present disclosure. Operations 800 may be performed, for example, by an Rx UE (e.g., such as UE 120a in the wireless communication network 100, as shown in FIG. 1).

Operations 800 may begin, at 810, by receiving a data transmission from a Tx UE. The data transmission may indicate that a distance-based HARQ feedback is required for the data transmission. The process may then determine, at 820, whether the data transmission has failed (e.g., the data in the data transmission could not be decoded successfully) and the Tx-Rx distance is unknown (e.g., when the location of the Rx UE and/or the Tx UE cannot be determined). When the process determines that either the data transmission was successful or the Tx-Rx distance is determinable, the process may end. In other words, when the process determines that there is no need for a DB NACK transmission, the process may end.

On the other hand, when the process determines that both conditions are satisfied (e.g., the data has not been decoded successfully and the Tx-Rx distance is not determinable), the process may determine, at 830, whether one or more measurements on sidelink satisfy one or more threshold measurements. The threshold measurements may be configured to the Rx UE (by a BS, or the Tx UE, or pre-configured, as described above), or may be predefined. If the process determines that the channel measurements do not satisfy the threshold measurements, the process may end.

On the other hand, if the process determines that the channel measurements satisfy the threshold measurements, the process may determine, at 840, whether the priority assigned to the NACK feedback (which may be the same as the priority of the corresponding data transmission received at 810) is greater than a priority threshold (e.g., configured to the Rx UE by a BS or the Tx UE, as described above). If the priority of the NACK feedback is lower than the priority threshold, the process may end.

On the other hand, if the process determines that the priority assigned to the NACK feedback is greater than the priority threshold, the process may transmit, at 850, the NACK feedback for the received data transmission to the Tx UE. The process may then end. It should be noted that the DB NACK transmission may still be subject to priority-based feedback selection, as described above. For example, when there are multiple DB NACK feedbacks to be transmitted to the Tx UE(s), the highest ranked NACK feedback may be selected first.

Figure 9:
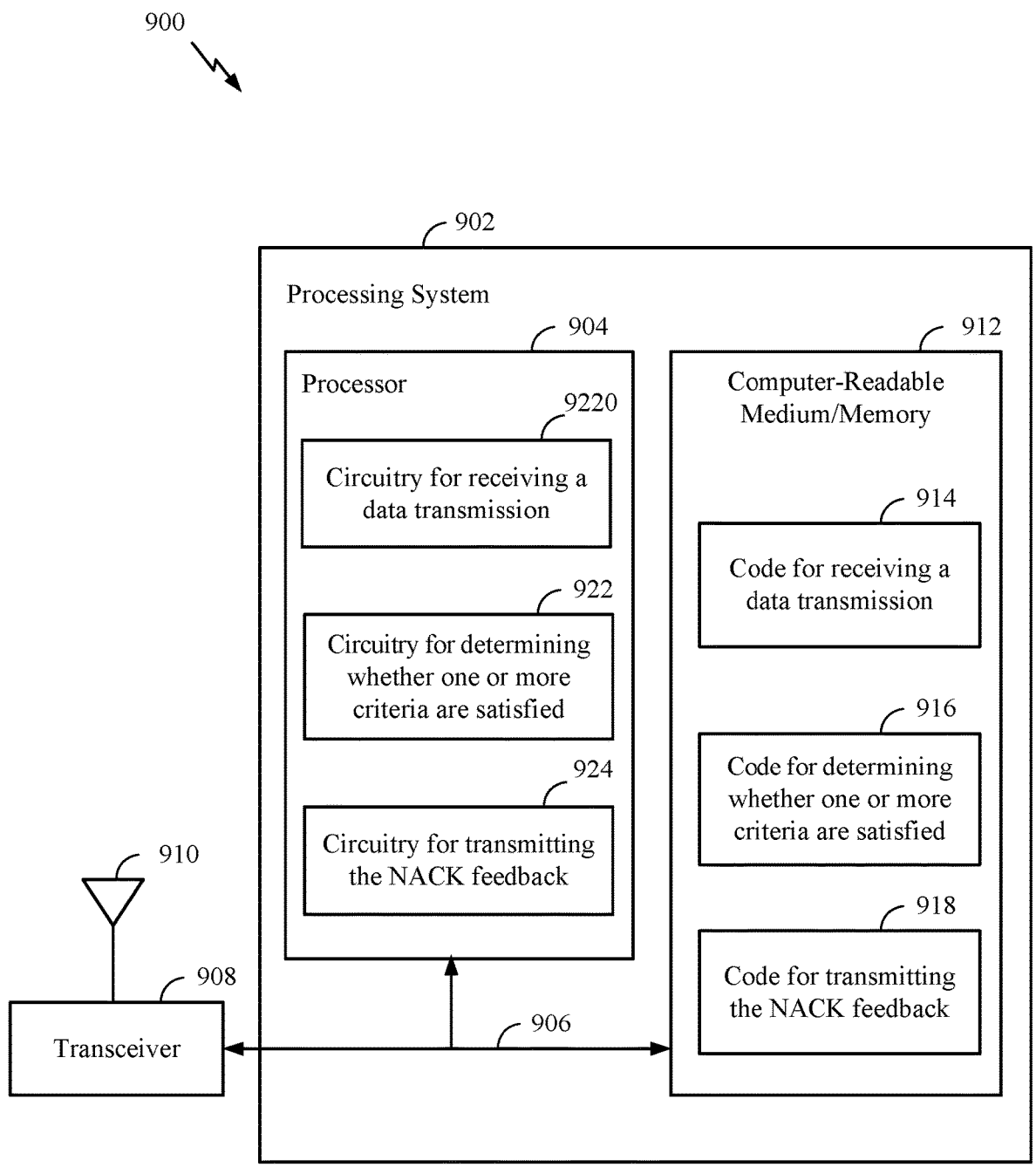
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIGS. 5-8. The communications device 900 may include a processing system 902 coupled to a transceiver 908 (e.g., a transmitter and/or a receiver). The transceiver 908 may be configured to transmit and receive signals for the communications device 900 via an antenna 910, such as the various signals as described herein. The processing system 902 may be configured to perform processing functions for the communication device 900, including processing signals received and/or to be transmitted by the communications device 900.

The processing system 902 may include a processor 904 coupled to a computer-readable medium/memory 912 via a bus 906. In certain aspects, the computer-readable medium/memory 912 may be configured to store instructions (e.g., computer-executable code) that when executed by the processor 904, cause the processor 904 to perform the operations illustrated in FIG. 5, or other operations for performing the various techniques discussed herein for distance based (HARQ) feedback transmission. In certain aspects, computer-readable medium/memory 912 may store code 914 for receiving, at a first UE, a data transmission from a second UE, the data transmission being associated with a feedback procedure for data transmissions that is based on a distance between the first UE and a transmitting UE, where the first UE cannot successfully decode the data transmission, and where the first UE cannot determine the distance between the first UE and the second UE; code 916 for determining whether one or more criteria are satisfied for sending, to the second UE, a NACK for the data transmission as part of the feedback procedure, the NACK indicating the first UE could not successfully decode the data transmission; and/or code 918 for transmitting the NACK to the second UE when the one or more criteria are satisfied.

In certain aspects, the processor 904 may have circuitry configured to implement the code stored in the computer-readable medium/memory 912. The processor 904 may include circuitry 920 for receiving, at a first UE, a data transmission from a second UE, the data transmission being associated with a feedback procedure for data transmissions that is based on a distance between the first UE and a transmitting UE, where the first UE cannot successfully decode the data transmission, and where the first UE cannot determine the distance between the first UE and the second UE; circuitry 922 for determining whether one or more criteria are satisfied for sending, to the second UE, a NACK for the data transmission as part of the feedback procedure, the NACK indicating the first UE could not successfully decode the data transmission; and/or circuitry 924 for transmitting the NACK to the second UE when the one or more criteria are satisfied.

Example Embodiments

Embodiment 1: A method for wireless communications by a first user equipment (UE), comprising: receiving, at the first UE, a data transmission from a second UE, the data transmission being associated with a feedback procedure for data transmissions that is based on a distance between the first UE and a transmitting UE, wherein the first UE cannot successfully decode the data transmission, and wherein the first UE cannot determine the distance between the first UE and the second UE; determining whether one or more criteria are satisfied for sending, to the second UE, a negative acknowledgement (NACK) for the data transmission as part of the feedback procedure, the NACK indicating the first UE could not successfully decode the data transmission; and transmitting the NACK to the second UE when the one or more criteria are satisfied.

Embodiment 2: The method of Embodiment 1, wherein the first UE is configured to transmit up to a first number of feedbacks during a time interval, and wherein the one or more criteria comprise whether the first UE has available capacity to transmit the NACK during the time interval based on the first number of feedbacks, a second number of feedbacks the first UE has for transmission during the time interval based on the feedback procedure, and a third number of feedbacks the first UE has for transmission during the time interval based on a second feedback procedure that is not based on a distance between the first UE and a transmitting UE.

Embodiment 3: The method of any of Embodiments 1 and 2, wherein, when the third number of feedbacks is greater than, or equal to, the first number of feedbacks, the one or more criteria are not satisfied.

Embodiment 4: The method of any of Embodiments 1-3, wherein, when the third number of feedbacks is less than the first number of feedbacks, the one or more criteria are satisfied.

Embodiment 5: The method of any of Embodiments 1-3, wherein, when the third number of feedbacks is less than the first number of feedbacks, and when a priority of the data transmission is among the Nth highest priorities of data transmissions associated with the second number of feedbacks, N being equal to the first number of feedbacks minus the third number of feedbacks, the one or more criteria are satisfied.

Embodiment 6: The method of any of Embodiments 1-3, further comprising, when the third number of feedbacks is less than the first number of feedbacks, determining that the one or more criteria are not satisfied when a priority of the data transmission is less than a priority threshold.

Embodiment 7: The method of Embodiment 6, further comprising receiving an indication of the priority threshold from a base station.

Embodiment 8: The method of any of Embodiments 1-2, wherein, when a fourth number of feedbacks, corresponding to those of the third number of feedbacks having a priority that satisfies a threshold, is less than the first number of feedbacks, determining whether the one or more criteria are satisfied is based on whether a priority of the data transmission satisfies the threshold.

Embodiment 9: The method of Embodiment 8, wherein, when the fourth number of feedbacks is equal to or greater than the first number of feedbacks, the one or more criteria are not satisfied.

Embodiment 10: The method of any of Embodiments 8-9, wherein, when a priority of the data transmission is among the Nth highest priorities of data transmissions associated with the second number of feedbacks that satisfy the threshold, N being equal to the first number of feedbacks minus the fourth number of feedbacks, the one or more criteria are satisfied.

Embodiment 11: The method of Embodiment 1, wherein the one or more criteria comprise whether a threshold number of retransmissions of the data transmission by the second UE has been reached.

Embodiment 12: The method of Embodiment 11, wherein receiving the data transmission comprises receiving the data transmission on a sidelink channel, the method further comprising determining a number of retransmissions from the second UE based on signaling received in a sidelink control information (SCI).

Embodiment 13: The method of any of Embodiments 11 and 12, wherein the threshold number of retransmissions comprises a maximum number of retransmissions allowed for the data transmission in a medium access control (MAC) or physical layer.

Embodiment 14: The method of any of Embodiments 11-13, wherein the data transmission received from the second UE comprises a MAC layer data transmission, and further comprising, after transmitting the NACK to the second UE, receiving a higher layer data transmission from the second UE.

Embodiment 15: The method of Embodiment 1, wherein receiving the data transmission comprises receiving the data transmission on a sidelink channel, and wherein the one or more criteria comprise whether a measurement of the sidelink channel satisfies a threshold.

Embodiment 16: The method of Embodiment 15, wherein the one or more criteria further comprise whether a priority of the data transmission satisfies a priority threshold.

Embodiment 17: The method of any of Embodiments 15 and 16, wherein the measurement comprises a channel busy ratio (CBR) of the sidelink channel.

Embodiment 18: The method of Embodiment 17, wherein the one or more criteria are satisfied when the CBR of the sidelink channel is below a threshold.

Embodiment 19: The method of Embodiment 15, wherein the measurement comprises a received signal strength of the data transmission.

Embodiment 20: The method of Embodiment 19, wherein the one or more criteria are satisfied when the received signal strength of the data transmission is below a threshold.

Embodiment 21: The method of Embodiment 1, wherein the first UE cannot determine the distance between the first UE and the second UE because a location of at least one of the first UE and the second UE is unavailable to the first UE.

Embodiment 22: The method of Embodiment 1, wherein receiving the data transmission from the second UE comprises receiving the data transmission directly from the second UE on a sidelink channel.

Embodiment 23: The method of Embodiment 1, wherein the NACK comprises a hybrid automatic repeat request (HARM) NACK.

Embodiment 24: A user equipment (UE) comprising: a memory; and a processor coupled to the memory, wherein the memory and the processor are configured to perform the method of one or more of Embodiments 1-23.

Embodiment 25: A user equipment (UE) comprising: various means for performing the method of one or more of Embodiments 1-23.

Embodiment 26: A non-transitory computer-readable medium including instructions that when executed by a user equipment (UE), cause the UE to perform the method of one or more of Embodiments 1-23.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5-8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A first user equipment (UE), comprising:
memory; and
one or more processors coupled to the memory, wherein the memory and the one or more processors are configured to:
receive a data transmission from a second UE, the data transmission being associated with a distance-based feedback procedure for data transmissions, wherein the first UE cannot successfully decode the data transmission, and wherein the first UE cannot determine a distance between the first UE and the second UE;
determine whether one or more criteria are satisfied for sending, to the second UE, a negative acknowledgement (NACK) for the data transmission as part of the distance-based feedback procedure, the NACK indicating the first UE could not successfully decode the data transmission;
transmit up to a first number of feedbacks during a time interval, wherein the one or more criteria comprise whether the first UE has available capacity to transmit the NACK during the time interval based on the first number of feedbacks, a second number of feedbacks the first UE has for transmission during the time interval based on the distance-based feedback procedure, and a third number of feedbacks the first UE has for transmission during the time interval based on a non-distance-based feedback procedure; and
transmit the NACK to the second UE during the time interval when the one or more criteria are satisfied.

2. The first UE of claim 1, wherein, when the third number of feedbacks is greater than, or equal to, the first number of feedbacks, the one or more criteria are not satisfied.

3. The first UE of claim 2, wherein, when the third number of feedbacks is less than the first number of feedbacks, the one or more criteria are satisfied.

4. The first UE of claim 2, wherein, when the third number of feedbacks is less than the first number of feedbacks, and when a priority of the data transmission is among the Nth highest priorities of data transmissions associated with the second number of feedbacks, N being equal to the first number of feedbacks minus the third number of feedbacks, the one or more criteria are satisfied.

5. The first UE of claim 2, wherein the memory and the one or more processors are configured to, when the third number of feedbacks is less than the first number of feedbacks, determine that the one or more criteria are not satisfied when a priority of the data transmission is less than a priority threshold.

6. The first UE of claim 1, wherein, when a fourth number of feedbacks, corresponding to those of the third number of feedbacks having a priority that satisfies a threshold, is less than the first number of feedbacks, determining whether the one or more criteria are satisfied is based on whether a priority of the data transmission satisfies the threshold.

7. The first UE of claim 6, wherein, when the fourth number of feedbacks is equal to or greater than the first number of feedbacks, the one or more criteria are not satisfied.

8. The first UE of claim 7, wherein, when a priority of the data transmission is among the Nth highest priorities of data transmissions associated with the second number of feedbacks that satisfy the threshold, N being equal to the first number of feedbacks minus the fourth number of feedbacks, the one or more criteria are satisfied.

9. The first UE of claim 1, wherein the one or more criteria comprise whether a threshold number of retransmissions of the data transmission by the second UE has been reached.

10. The first UE of claim 9, wherein receiving the data transmission comprises receiving the data transmission on a sidelink channel, wherein the memory and the one or more processors are further configured to determine a number of retransmissions from the second UE based on signaling received in a sidelink control information (SCI).

11. The first UE of claim 9, wherein the threshold number of retransmissions comprises a maximum number of retransmissions allowed for the data transmission in a medium access control (MAC) or physical layer.

12. The first UE of claim 9, wherein the data transmission received from the second UE comprises a MAC layer data transmission, and wherein the memory and the one or more processors are configured to, after transmitting the NACK to the second UE, receive a higher layer data transmission from the second UE.

13. The first UE of claim 1, wherein receiving the data transmission comprises receiving the data transmission on a sidelink channel, and wherein the one or more criteria comprise whether a measurement of the sidelink channel satisfies a threshold.

14. The first UE of claim 13, wherein the one or more criteria further comprise whether a priority of the data transmission satisfies a priority threshold.

15. The first UE of claim 13, wherein the measurement comprises a channel busy ratio (CBR) of the sidelink channel.

16. The first UE of claim 15, wherein the one or more criteria are satisfied when the CBR of the sidelink channel is below a threshold.

17. The first UE of claim 13, wherein the measurement comprises a received signal strength of the data transmission.

18. The first UE of claim 17, wherein the one or more criteria are satisfied when the received signal strength of the data transmission is below a threshold.

19. The first UE of claim 1, wherein the first UE cannot determine the distance between the first UE and the second UE because a location of at least one of the first UE and the second UE is unavailable to the first UE.

20. A method for wireless communications by a first user equipment (UE), comprising:
receiving, at the first UE, a data transmission from a second UE, the data transmission being associated with a distance-based feedback procedure for data transmissions, wherein the first UE cannot successfully decode the data transmission, and wherein the first UE cannot determine a distance between the first UE and the second UE;
determining whether one or more criteria are satisfied for sending, to the second UE, a negative acknowledgement (NACK) for the data transmission as part of the distance-based feedback procedure, the NACK indicating the first UE could not successfully decode the data transmission;
transmitting up to a first number of feedbacks during a time interval, and wherein the one or more criteria comprise whether the first UE has available capacity to transmit the NACK during the time interval based on the first number of feedbacks, a second number of feedbacks the first UE has for transmission during the time interval based on the distance-based feedback procedure, and a third number of feedbacks the first UE has for transmission during the time interval based on a non-distance-based feedback procedure; and
transmitting the NACK to the second UE during the time interval when the one or more criteria are satisfied.

21. The method of claim 20, wherein, when the third number of feedbacks is greater than, or equal to, the first number of feedbacks, the one or more criteria are not satisfied.

22. The method of claim 21, further comprising, when the third number of feedbacks is less than the first number of feedbacks, determining that the one or more criteria are not satisfied when a priority of the data transmission is less than a priority threshold.

23. The method of claim 20, wherein, when a fourth number of feedbacks, corresponding to those of the third number of feedbacks having a priority that satisfies a threshold, is less than the first number of feedbacks, determining whether the one or more criteria are satisfied is based on whether a priority of the data transmission satisfies the threshold.

24. The method of claim 20, wherein the one or more criteria comprise whether a threshold number of retransmissions of the data transmission by the second UE has been reached.

25. The method of claim 20, wherein receiving the data transmission comprises receiving the data transmission on a sidelink channel, and wherein the one or more criteria comprise whether a measurement of the sidelink channel satisfies a threshold.

26. The method of claim 25, wherein the one or more criteria further comprise whether a priority of the data transmission satisfies a priority threshold.

27. A first user equipment (UE) comprising:
means for receiving, at the first UE, a data transmission from a second UE, the data transmission being associated with a distance-based feedback procedure for data transmissions, wherein the first UE cannot successfully decode the data transmission, and wherein the first UE cannot determine a distance between the first UE and the second UE;
means for determining whether one or more criteria are satisfied for sending, to the second UE, a negative acknowledgement (NACK) for the data transmission as part of the distance-based feedback procedure, the NACK indicating the first UE could not successfully decode the data transmission;
means for transmitting up to a first number of feedbacks during a time interval, and wherein the one or more criteria comprise whether the first UE has available capacity to transmit the NACK during the time interval based on the first number of feedbacks, a second number of feedbacks the first UE has for transmission during the time interval based on the distance-based feedback procedure, and a third number of feedbacks the first UE has for transmission during the time interval based on a non-distance-based feedback procedure; and
means for transmitting the NACK to the second UE during the time interval when the one or more criteria are satisfied.

28. A non-transitory computer-readable medium including instructions that when executed by a first user equipment (UE), cause the first UE to perform a method for wireless communications, comprising:
receiving, at the first UE, a data transmission from a second UE, the data transmission being associated with a distance-based feedback procedure for data transmissions, wherein the first UE cannot successfully decode the data transmission, and wherein the first UE cannot determine a distance between the first UE and the second UE;
determining whether one or more criteria are satisfied for sending, to the second UE, a negative acknowledgement (NACK) for the data transmission as part of the distance-based feedback procedure, the NACK indicating the first UE could not successfully decode the data transmission;
transmitting up to a first number of feedbacks during a time interval, and wherein the one or more criteria comprise whether the first UE has available capacity to transmit the NACK during the time interval based on the first number of feedbacks, a second number of feedbacks the first UE has for transmission during the time interval based on the distance-based feedback procedure, and a third number of feedbacks the first UE has for transmission during the time interval based on a non-distance-based feedback procedure; and
transmitting the NACK to the second UE during the time interval when the one or more criteria are satisfied.

* * * * *